March 12, 1929.  C. L. BROWN  1,704,821
DISPLAY FIXTURE
Filed July 23, 1926  2 Sheets-Sheet 1
Fig. 1
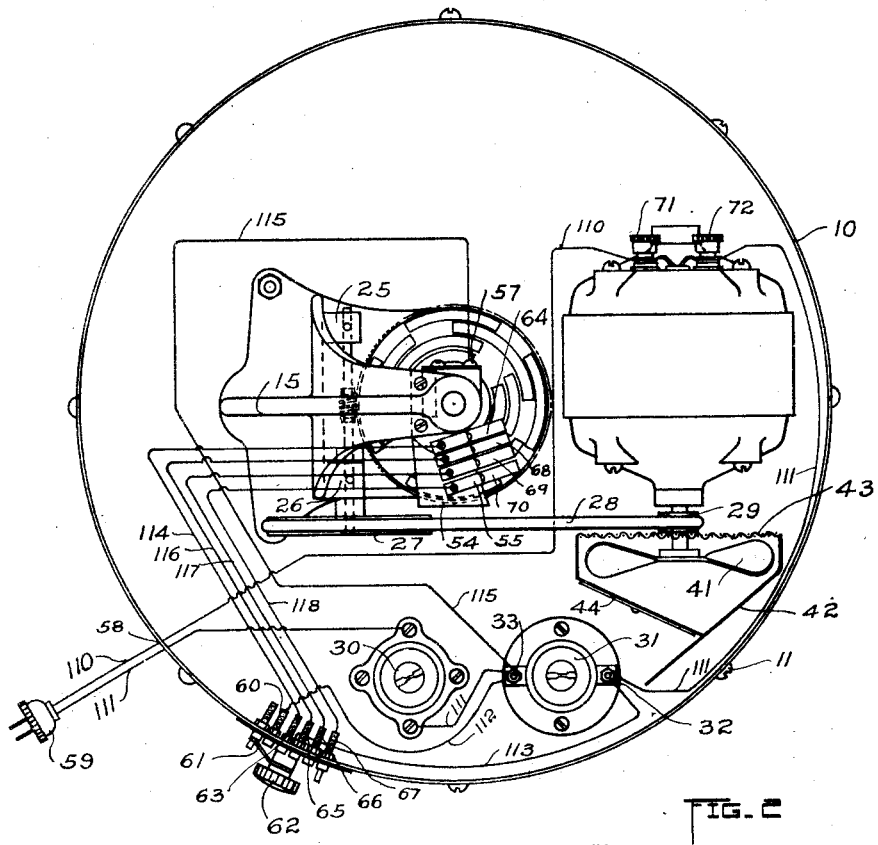
Fig. 2
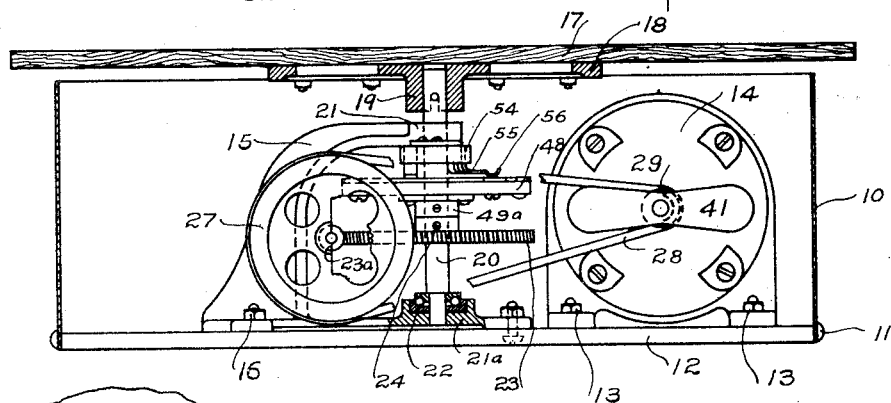
Fig. 3
INVENTOR
By Curtis L. Brown
Tefft and Tefft
ATTORNEYS March 12, 1929.  C. L. BROWN  1,704,821
DISPLAY FIXTURE
Filed July 23, 1926  2 Sheets-Sheet 2
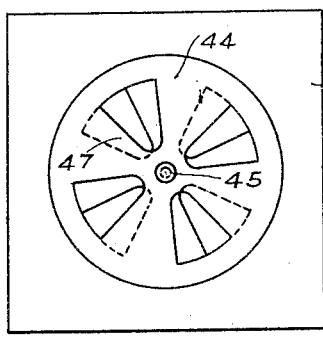
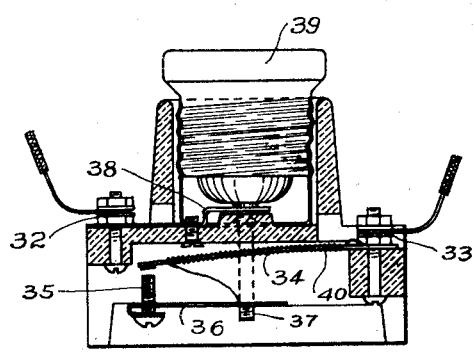
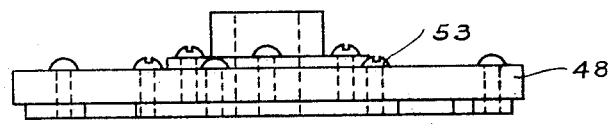
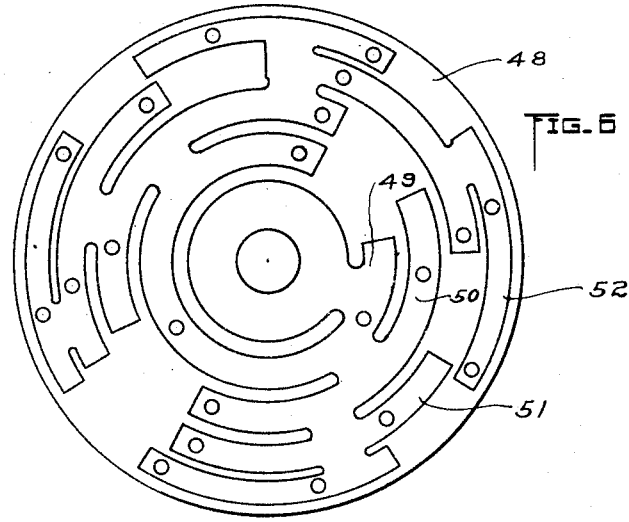
INVENTOR
Curtis L. Brown
BY
Tefft and Tefft
ATTORNEYS Patented Mar. 12, 1929.

1,704,821

UNITED STATES PATENT OFFICE.

CURTIS L. BROWN, OF PEORIA, ILLINOIS.

DISPLAY FIXTURE.

Application filed July 23, 1926. Serial No. 124,322.

This invention relates to display fixtures, and more particularly to either continuously rotatable or intermittently rotatable, display fixtures.

One of the objects of the invention is in the provision of a small motion display fixture, the same having a table portion driven by an electric motor, mechanism being included for controlling the movement of said table.

A further object is in the provision of a motion display fixture having a power driven table portion, with such electrical control mechanism provided as to permit continuous rotation of such table or intermittent rotation thereof in practically any manner that is desired.

A still further object is in the provision of a simple motion display fixture, including a power driven rotating table portion, electrical switch mechanism for controlling same to vary the rotation of said table and thermal control means for regulating said switch mechanism.

Another object is in the provision of an electric motor driven table member and switch mechanism for controlling the operation thereof to permit not only continuous rotation of said table, but also interrupted rotation in various degrees and manners of intermittent rotation.

Still another object is in the provision of a small, compact motion display fixture, including an electric motor driven, rotatable table portion, a special electrical switch board controlling the continuous and intermittent rotation of said table, a thermal member permitting the automatic intermittent operation of said table and a cooling member for hastening the operation of the thermal member.

Still other objects will appear in the following specifications, taken in connection with the annexed drawings, in which—

Fig. 1 is a plan view of the motion display fixture, with the table portion thereof removed;

Fig. 2 is a side elevation, with portions thereof broken away for a more detailed disclosure of the driving mechanism;

Fig. 3 is a detailed showing of the manually operable switch board;

Fig. 4 is an enlarged detail of the mechanism for controlling the fan blast;

Fig. 5 is a cross-sectional view showing in detail the mounting of the automatically operating thermal member;

Fig. 6 is a plan view of the automatic switch member; and

Fig. 7 is an end elevation of the parts shown in Fig. 6.

Referring to the drawings, there is shown in Figs. 1 and 2 the general assembly of the motion display fixture, which in the present form has been designed for use primarily in the display of models in store windows. It is obvious, however, that such a device might just as well be used in the display of any class of merchandise, wherein it is desired to move same either continuously before the eye of the prospective purchaser, or intermittently in such manner as to permit views of same in various positions.

Applicant realizes that devices have heretofore been used for rotating models and other merchandise desired to be displayed by motion, said devices, however, not being similar to applicant's structure either in action, structure, simplicity or result accomplished. Applicant has devised an electric motor driven table portion that may be either continuously rotated or manually set at various adjustments that will give to said table intermittent motion of substantially any timing or degree of movement that can possibly be desired. Similarly, it is possible, by manual adjustment, to reverse the movement of the table member and to control same automatically in exactly the same manner, if so desired, it being possible that in the use of two of such devices located one adjacent the other, that the direction of movement be reversed with respect to one of them.

To accomplish the above results, applicant has employed the following structure and mechanism. A cylindrically shaped outer casing is shown at 10, said casing being either of metal or wood, as may be desired. Removably attached to said outer casing, by means of the screw members 11, is a bottom portion or supporting plate 12. Securely attached, as at 13, to the bottom portion 12, is a small electric motor 14 of well known design. A supporting bracket 15 is fixedly attached by means of the bolt member 16, to the bottom portion 12 a short distance from the electric motor, said supporting bracket acting as a support for the rotatable table portion 17, which in the present instance, is made of wood. The connection between the table portion 17 and the supporting bracket 15 includes a plate 18, securely attached to the under side of the rotatable table 17, said plate having a hub portion 19 apertured in a manner for manual, vertical removal, but otherwise having a fixed connection with the upper end of a vertically disposed drive shaft 20, said drive shaft having for its upper bearing support the upwardly projecting portion 21 of the supporting bracket 15. The lower support for the drive shaft 20 is shown at 21ᵃ and includes the ball bearing 22 of well known design, adapted to take up the thrust on said shaft which attends its vertical position and drive. Means for driving the vertically disposed drive shaft 20 is provided in the following mechanism. A worm gear 23 is keyed, as at 24, to the shaft 20, said gear being driven by a worm 23ᵃ, said worm being carried in supports 25 and 26, cast integrally with the supporting bracket 15. A pulley 27 is attached to one of the projecting ends of the worm and said pulley has power transmitted thereto by the belt 28, which is driven by the before-mentioned electric motor 14, the belt riding over a small pulley 29 attached to the axis or drive shaft thereof.

It is obvious at this time that the speed of the table 17 when rotated, may be varied by varying the size of the pulleys above referred to and that the merchandise to be displayed will determine the size of the pulleys to be used.

So far, applicant has described operative structure for continuously rotating the table portion 17 at a certain speed, with intimation that such speed could be varied by varying the size of the pulleys. However, applicant desires not only to have a continuously rotatable table member, but also to provide control mechanism permitting not only intermittent rotation of said table, but also varied degrees of intermittent rotation, to be automatically controlled, after once being manually set at the desired point.

To accomplish the above result, applicant has provided the following switch and control mechanism. At 30, we find a fuse plug of well known design. At 31 is disclosed a thermally controlled switch plug. Although this thermal control switch plug is of well known design, in order to bring out clearly the automatic operation of the present device, it has been felt necessary to described, substantially in detail, said plug.

In Fig. 5, there is shown a detail view of said plug, wherein there is shown the terminals 32 and 33. The connection between said terminals to permit the passage of current therethrough is made by a contact member, generally described as 34. The contact member 34 does not make the connection directly between the terminals 32 and 33 as would occur in a switch of simplest construction, but whenever the contact member is in engagement with the contact screw 35, the electrical current will pass through the strip 36, therefore through the screws 37, thence through the strip 38 to the terminal 32.

However, the present contact member 34 is not merely a simple contact strip, but is a bi-metallic or thermal strip. In other words, it is a member sensitive to temperature conditions and makes contact or breaks contact, due to the amount of electrical resistance in the wire 40, that encircles same, as may be clearly seen in Fig. 5. In other words, whenever the contact is broken between strip 34 and the screw 35, and the current is on, the wire 40 encircling the thermal strip will cause same to raise the temperature of the thermal strip and thereafter cause same to bend towards the screw 35, and when said contact is made therewith, the electrical circuit will be completed between the terminals 32 and 33, with the result that the resistance in the encircling thermal member 40 will be lessened to permit cooling of the bi-metallic contact 34, with the result that same will automatically begin to cool, and after a certain time, flex in the opposite direction to break the circuit between the terminals 32 and 33. This type of plug, when used ordinarily, and even in one manner in the present instance, is an automatic circuit breaker, in that when the current is on, the thermal strip will become heated and shortly thereafter make contact with the screw 35, whereupon a circuit will be completed between the terminals 32 and 33. Thereafter, upon the making of such circuit, there will be a reduction of the resistance in the wire 40 with the result that the thermal member will immediately start to cool and shortly thereafter break the electrical circuit, and following, it is obvious that upon the breaking of the current there will again be sufficient resistance in the wire to actually cause the thermal member to flex towards the screw 35, with a continuous and intermittent opening and closing of the electrical circuit.

The above thermal plug, as it is sometimes called, has been described in detail, inasmuch as it is an essential feature in the electrical control system of the present device. It might also be stated that the screw 35 is adjustable in order to vary the time of automatic operation of the plug. Also, to hasten the action of the automatic thermally operated plug above described, a small fan 41 is attached to the projecting shaft of the electric motor, the same being adapted to project a cooling air blast upon the thermal member, and therefore cool same quickly, with the result, as above stated, of hastening the operation of the plug.

A surrounding casing for the fan is shown at 42, fashioned to project the blast directly upon the thermal plug. A screen at the rear of the fan is shown at 43 and disposed directly in front of the fan is a means for controlling the force of said cooling blast to further vary the cooling effect of said blast. The means above referred to is the manually operated shutter mechanism shown in Fig. 4 of the drawings, wherein a shutter 44 is pivoted, as at 45, to the frame 46, said shutter 44 being adapted to be manually moved either clockwise or counter-clockwise, to cover the openings 47 entirely, partially, or not at all, as may be desired.

Before going into detail as to the electrical circuit, and operation of the present device, it is thought well to describe the physical make-up of the rotating contact plate, which forms an essential portion of the electrical control mechanism. This contact plate is shown at 48, the same being fixedly attached, as 49ª, to the vertical shaft 20 and being adapted to rotate therewith at the same speed, of course, as the worm gear 23, disposed therebelow. This plate 48 has disposed thereon four series of arcuately shaped contact strips designated respectively 49, 50, 51 and 52. These contact strips are merely copper contact members attached by means of the plural screw members 53 to the contact plate 48, before mentioned. A careful consideration of these strips will show that the strip 49 almost completely encircles the plate, while the strips 50, 51 and 52 merely encircle half the plate, one-third of the plate and finally a fourth of the plate. It is obvious that these strips are disposed in the above described manner on the rotating plate 48 with the idea of controlling the movement of the table 17 intermittently, said strips operating to complete an electric circuit, as far as the strips 49 are concerned, while the plate makes a complete revolution, the gap in the strip denoting the time when the plate stops. Similarly, the other strips would denote other degrees of intermittent operation of the plate for a half revolution, one third of a revolution and a quarter of a revolution.

To connect the plate 48 and the strips thereon with the electrical circuit, we find a bracket 54, securely attached to the supporting bracket 15, the same carrying the series of brushes described at 55, adapted to contact with the arcuately shaped copper strips on the rotating plate. It will be noted that these brushes 55 have their contact ends upturned slightly as at 56, such fashioning of the brushes being necessary when the table is to be reversed, as will be later described. The circuit, with respect to the brushes 55 and copper strips on the rotating plate 48, is completed through a terminal 57 disposed similarly on the supporting bracket 15, but at the opposite side thereof.

Now, with respect to the electrical circuit, we find the line wires 110 and 111 entering through the outer casing as at 58. The line wire 110 runs directly to the electric motor, while the wire 111 runs to the conventional fuse plug 30, passing through said plug and after passing through the thermal switch 39, connects with the electric motor. The lead wires 110 and 111 may be plugged into any convenient socket by means of the connecting member 59, and it is obvious that when such connection is made the electric motor will be energized, with the resultant movement of the mechanism driving the table 17 and consequent rotation thereof. However, inasmuch as the automatic thermal plug has the electric circuit passing therethrough, the thermal strip 34 will be heated and cooled, as the case may be, to open and close automatically the circuit to the electric motor, with a consequent starting and stopping of the table 17. This is one of the intermittent movements of the table 17 that may be obtained, and is obtained by merely plugging in the electrical connection in any conventional socket member.

When it is desired to rotate the table continuously, it is necessary to change the electric circuit so that the electric current does not pass through the automatic plug. To accomplish this result, a connection is made between the terminal 33 and a terminal 60, said connection being designated 112. To complete the electrical circuit in a manner to cut out the automatic plug, a second connection 113 is made between the terminal 60, or rather the contact 61, manually controlled by the knob 62, and the terminal 32 on the automatic plug. When the contact member 61 is moved to engagement with the terminal 60, by means of the manually controlled knob 62, the following circuit is completed. Current passes through the line wire 110 to the electric motor, thence through the wire 111 to the contact 32, thence through the wire 113 to the terminal 60, the contact being completed through the contact member 61, thence through the wire 112 to the terminal 33, passing from said terminal through the wire 111 to the fuse plug 30, and from said plug through the wire 111 to the line connection, thereby completing the circuit.

There has now been described an intermittent operation of the table, accomplished by the passage of the line current through the automatic plug, also the continuous rotation of the table member by completing a circuit through the electric motor, without including the automatic plug. It is obvious that without passing current through the automatic plug, the electric motor will operate continuously with a resultant continuous rotation of the table 17.

It is further desired to provide other modes of intermittent rotation of the table, for instance, by moving the table completely around, then stopping same, also moving the table half its distance, as well as one third, and one quarter of its distance, with intermediate stops.

To accomplish this intermittent operation of the table, the rotating switch plate 48 above described has been included in the electrical circuit, when desired, in the following manner. Inasmuch as the plate 48 carries the four series of contact strips, and the four distinct brushes are adapted to contact said strips, and there is only one main electrical connection from the terminal 57, it has been thought necessary to describe the electrical circuit merely with respect to one of the series of strips of contact members, in order to bring out the operation thereof, as all of the intermittent operations of the table controlled by the plate 48, are the same. Take for instance the electrical circuit that is controlled by the arcuately shaped contact strip 49 on plate 48, said strip controlling a single continuous movement of the table, with a stop therein, and thereafter an automatic continuance of the movement. In the first place, the contact 61 is manually set by the knob 62, to engage terminal 63, with the result that an electrical circuit is completed, not only through the electric motor, and through the automatic plug, as would occur if the member 59 were inserted in any well known socket, but also through the wire 114, to the inner brush 64 of the series of brushes 55, thence through the contact strip 49 that almost completely encircles the inner portion of the plate 48, thereafter to the terminal 57 and finally through the wire 115 to the terminal 33 on the automatic plug.

With the inclusion of this additional circuit in the before-mentioned and described electrical circuit to the electric motor, which includes the automatic plug, we find that so long as the brush 64 is making contact with the strip 49, a circuit will be completed which does not include the automatic plug. In order to make this clear, we will trace the electrical circuit while the brush 64 is contacting the contact strip 49 on the rotating plate 48. Current passes, as before, through the wire 110 to the electric motor, thence through the wire 111 to the terminal 32 on the automatic plug, thence through the wire 113, terminal 63 on the plural switch or knob member 49, contact being completed between the terminal 63 and the wire 114 by the contact 61. The current passes thence through the wire 114 to the brush 64 and the circuit is completed as long as said brush rides on the contact strip 49 to the terminal 57, the current then passing through the wire 115 to the terminal 33, thereafter through the wire 111 to the fuse plug 30, and thence out the wire 111, thereby completing an electric circuit, wherein the automatic plug is short circuited.

It is obvious that during the completion of the above mentioned circuit, the table 17 will be continuously rotated. However, when the brush 64 leaves the contact strip 49, this new circuit which has been completed will be broken, with the result that the rotation of the table 17 will stop and a new electrical circuit must necessarily be shortly completed to permit the continued rotation of the table, or the cessation of operation of said table will be final. However, immediately upon the breaking of this new circuit, which included the strip 49 on the rotating table, the automatic plug is brought into operation in that the electrical circuit crowds into the wire 40 on the thermal contact strip 34, due to the breaking of the other circuit, and heats said contact strip, with the result that very shortly same will bend and make contact with the screw 35, thereby completing the circuit through said plug and permitting continued operation of the motor through the original electrical circuit first described.

Now, when the motor is energized by the operation of the automatic plug, the table commences to move and the strip 49 is again engaged by the brush 64, with the result that the before-mentioned electrical circuit that included the strip 49 on the rotatable plate 48 will again be completed, and thereby again complete an electric circuit that does not include the automatic plug, which has again been short-circuited.

It is now thought obvious that the table 17 will rotate another revolution before the brush 64 rides off of the strip 49. During this rotation of the table, however, the thermal metal contact strip 34 in the automatic plug will have had time to cool sufficiently so that it will again be out of contact with the screw 35, with the result that when said brush 64 again rides off of the contact strip 49, it will again be necessary for the electrical current to heat the strip sufficiently to again bend it into engagement with the screw 35, and thereby renew the operation of the motor and consequently of the table 48.

As stated before, each of the series of strips 49, 50, 51 and 52 operates in exactly the same manner, and the electrical circuits thereto are completed and broken in exactly the same manner through the terminals 65, 66 and 67, respectively, said circuits including in a similar manner, the wires 116, 117 and 118 respectively, as well as the brushes 68, 69 and 70.

In view of the detailed description of the circuit with respect to the strip 49 on the rotatable plate 48, as stated before it is not thought necessary to describe each one of these circuits, as they operate in exactly the same manner and upon the riding of the brush past the contact strip, the automatic plug will be thrown into operation to complete the circuit to the motor, thereby carrying one of the contact strips, whichever it may be, into engagement with the brush member to again automatically complete the circuit to control the intermittent movement of the table.

With the above detailed description of the electrical circuits and operation of the device generally, we find that the table has an intermittent movement transmitted thereto by merely inserting the member 59 in a conventional socket member, in this particular instance the electrical circuit being controlled by the automatic thermally operated plug. We find also that by completing the circuit above described that does not include the automatic, thermally controlled plug, the motor may be continuously energized, and thereafter the movement of the table continues. We also find that when it is desired to control the movement of the table by the movement of the plate 48, said table may be moved a complete revolution with a short stop and a continuation of said movement by completing the circuit through the strip 49 on the rotating plate, with the result that when the brush rides off the said strip, the automatic plug will be automatically thrown into operation to assist temporarily in the movement of the said plate, to again complete the circuit, which permits the continuous and single rotation of said plate. Further, by completing the circuit through the other brushes and strips on the rotating plate, other degrees of movement of the table may be effected.

Another adjustment of the present device which is sometimes desired is the reversal of movement of the table. This is accomplished by reversing the field of the motor with respect to its armature or vice versa, in the well known manner.

It might be also stated that any of the varied adjustments with respect to the intermittent rotation of the table may be just as well accomplished when the table is being reversed, as might be accomplished in its normal rotation. As a matter of fact, the brushes 55 have had their projecting ends 56 slightly upturned to prevent any possibility of incorrect contact with the contact strips on the rotating plate 48 in this reverse movement.

What I claim is:

1. A mechanism for operating a rotary member comprising an electric motor for rotating said member, mechanism permitting interrupted movement of said member, including an automatically operated thermal switch member and a fan member driven by said electric motor and adapted to hasten the action of said thermal switch member.

2. A mechanism for operating a rotary member comprising an electric motor for rotating said member, means permitting intermittent rotation of said member, said means including an automatically operated thermal switch member, a fan member operated by said electric motor and adapted to project a cooling air blast upon the thermal switch, and means for controlling the air blast from said fan with respect to said switch.

3. A mechanism for operating a rotary member comprising a rotary member, an electric motor for rotating said member, a plural switch member controlling the activity of said motor, an electric circuit controlled by said plural switch member permitting continued activity of said electric motor, a second electrical circuit including therein an automatically operating thermal switch member permitting intermittent activity of said electric motor, and a series of electrical circuits controlled by the rotation of said rotary member and the plural switch member for varying the time of intermittent activity of the electric motor as well as the interval of cessation.

4. A mechanism for operating a rotary members comprising a table member, an electric motor for rotating said table, and mechanism for controlling the activity of said motor and thereby the rotation of said table, including an automatically operated switch member operating intermittently to open and close the electric circuit to said motor and switch mechanism controlled by the movement of the table member for short-circuiting said automatic switch at determined intervals.

5. A mechanism for operating a rotary member comprising a table member, an electric motor for rotating said table, means for intermittently interrupting the electric motor and hence the table member, including an automatically operating thermal switch adapted to automatically open and close the electric circuit to the electric motor at certain intervals, mechanism controlled by the movement of the table member for short-circuiting said automatic switch at determined intervals, and means controlling the operation of said switch member to vary the short-circuiting interval of said automatic switch.

In testimony whereof, I have hereunto affixed my signature.

CURTIS L. BROWN.